July 21, 1953 W. J. HIRTREITER 2,646,517
LOW-FREQUENCY OSCILLATOR AND PHASE METER
Filed Aug. 12, 1952 2 Sheets-Sheet 1
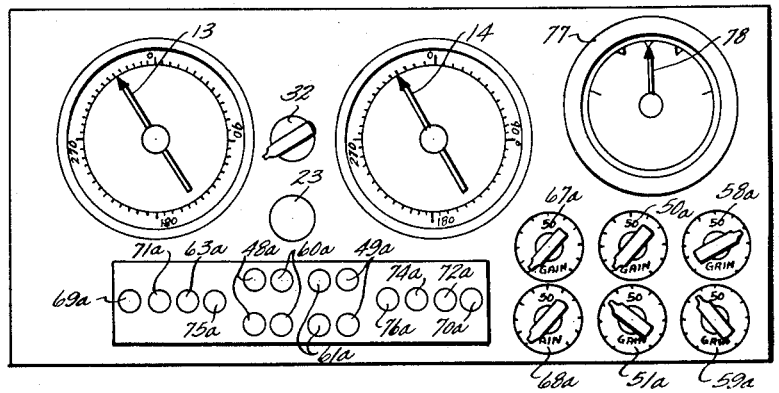
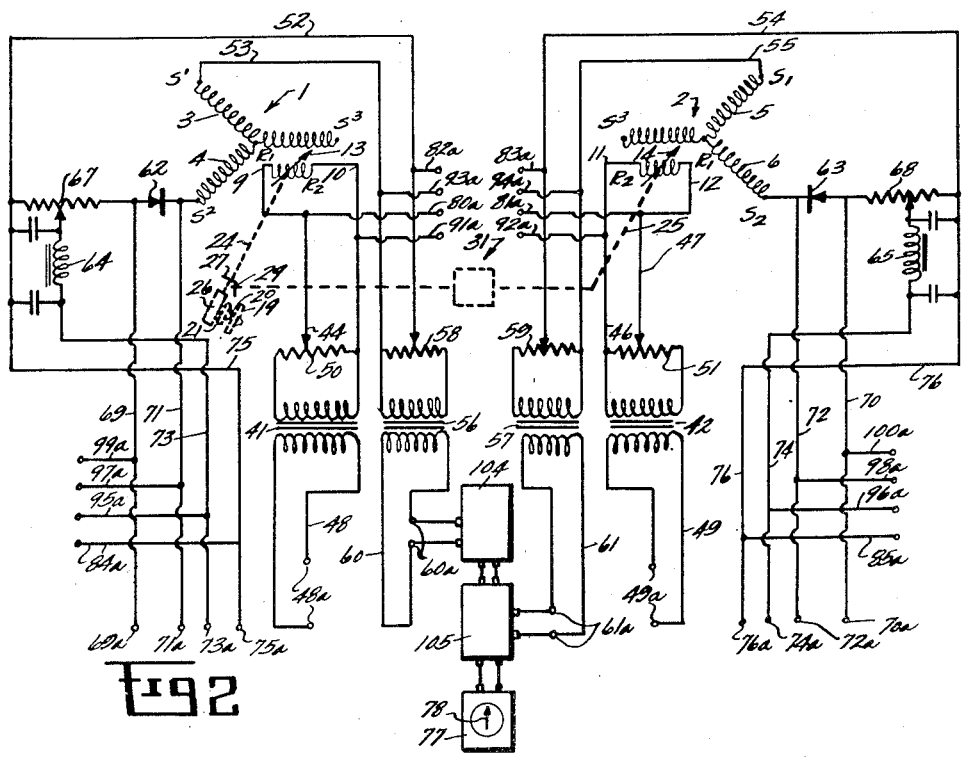
INVENTOR.
WALTER J. HIRTREITER
BY
ATTORNEYS July 21, 1953 W. J. HIRTREITER 2,646,517
LOW-FREQUENCY OSCILLATOR AND PHASE METER
Filed Aug. 12, 1952 2 Sheets-Sheet 2
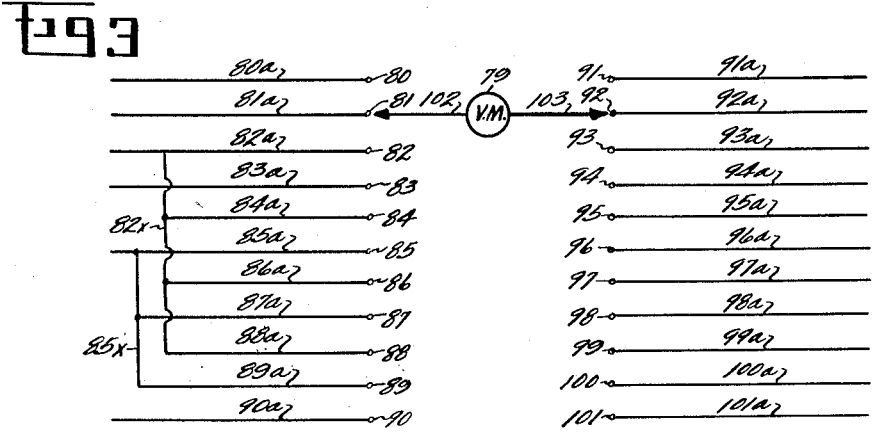
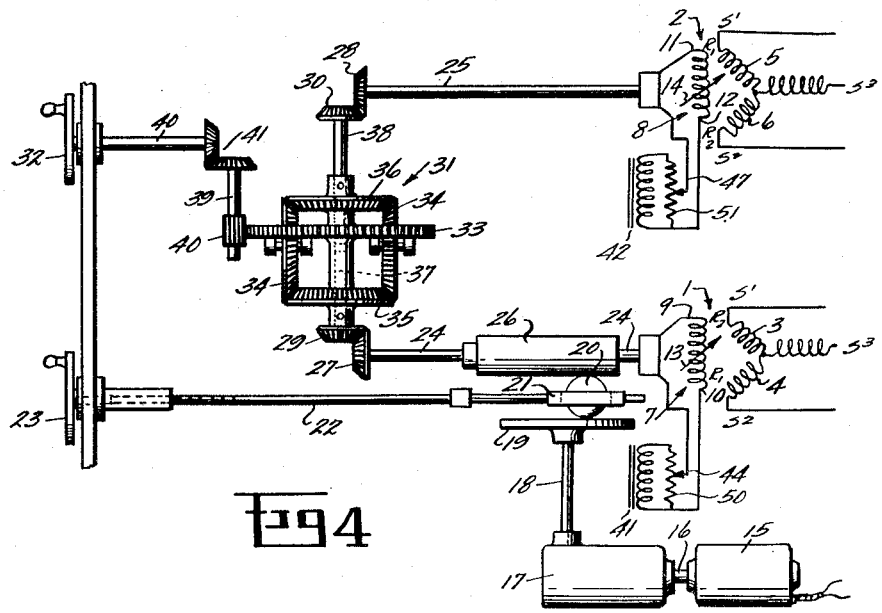
INVENTOR.
WALTER J. HIRTREITER
BY
ATTORNEYS Patented July 21, 1953

2,646,517

UNITED STATES PATENT OFFICE 2,646,517

LOW-FREQUENCY OSCILLATOR AND PHASE METER

Walter J. Hirtreiter, Buffalo, N. Y., assignor to the United States of America as represented by the Secretary of the Air Force Application August 12, 1952, Serial No. 304,027

12 Claims. (Cl. 307—106)

This invention relates to testing apparatus and more particularly to combined electrical and mechanical testing equipment, comprising a multiple low frequency oscillator and phase shifter device.

In carrying out the invention means are provided for generating two low frequency sine wave envelopes each having an A. C. potential and means for adjusting or shifting the phase relation therebetween, an object of the invention being means for obtaining frequency response data on servo-systems, such as auto pilots and similar control mechanisms, and on low frequency filter networks, used in aircraft recording systems, including means for varying a sine wave envelope cycle from the generating means from zero to about seven cycles per second, including means for varying the phase angle leads or lags of the sine waves 180 degrees in accordance with suitably connected mechanically actuated indicating means.

The invention includes a constant speed motor or power means for driving two sine wave generators simultaneously, a first one of the generators being driven directly by the motor through suitable speed reduction means and a constant variable speed drive means to adjust the sine wave output frequency of the test apparatus from zero to a relatively low sine wave cycle output per second, say between zero and seven cycles, the apparatus including a one to one ratio, an adjustable differential drive means between the first and second sine wave generator drive shafts for shifting or adjusting the relative phase angle relation of their respective sine wave outputs to any phase between zero, or in phase relation, and a 180 degree out of phase relation.

A further object of the invention is the provision of an electrical testing apparatus including a first sine wave generator having an output adapted to be connected to the input of a piece of electrical control apparatus, such as an auto pilot or similar electrical network equipment, and a second sine wave generator having an output adapted to be connected to the input of a simple electrical mixer to which the electrical output potential from the element being tested is also connected, including means for adjusting the phase and potential from the second generator to the mixer to produce a null signal output from the mixer, and including a phase angle comparison indicating means connected to each of the first generators and second generators for independent actuation thereby for indicating the relative variations in phase angles of the two sine wave generator outputs during the null signal indications.

Other objects and advantages of the invention will become apparent from the following description and accompanying drawings in which like reference characters refer to like parts in the several figures.

Drawings

Figure 1 is a perspective view of my improved apparatus illustrating the casing control dials, indicators and circuit terminals.

Figure 2 is a schematic diagram of the wiring circuits; and

Figure 3 is a schematic view of the measuring switch wiring arrangement for determining the electrical values in the several circuits.

Figure 4 is a somewhat diagrammatic view, showing in elevation my improved phase adjusting means between the sine wave generators for varying the relative phase relations therebetween and the improved continuously variable speed drive means between the motor and the generators.

Referring first to Figures 2 and 4 of the drawings the reference numerals 1 and 2 indicate generally, first and second test signal sine wave generators which are identical in construction and may be "autosyn" generators of conventional construction of the rotary transformer types in which one of the stator output leads 53 is not connected or used. The stator coils being used are indicated at $S_1$ and $S_2$ in both generators, more particularly indicated at 3—4 in generator 1, and 5—6 in generator 2. The rotors for the generators 1 and 2 are indicated at 7 and 8 respectively and include the exciting coils having terminals $R^1$ and $R^2$, more particularly indicated at 9—10 and 11—12 respectively in the rotors 7 and 8, the angular positions of the rotors being indicated respectively by the pointers 13 and 14, also shown in Figure 1 with cooperating phase angle indicating indicia.

The two rotors 7 and 8 are interconnected for simultaneous rotation at a constant but variable speed actuation by a constant speed electric motor power means 15, as seen in Figure 4, the motor 15 preferably being a governor control type having a drive shaft 16 which drives a speed reduction gear train contained in a speed reduction gear box 17 having a reduced or relatively low speed output drive shaft 18, preferably driven at about 7 revolutions per second (420 R. P. M.). A friction drive disc 19 is fixed on the shaft 18 and drives a hardened friction drive ball, preferably of steel, indicated at 20 and carried in and shiftable by a carrier 21, adjustable across the disc 19 in a line through the axis of shaft 18 by a connected shifter rod 22, threaded in, or suitably shifted by, a rotary actuator having a rotatably adjusting knob 23, also shown in Figure 1 at the front of the panel.

The two rotors 7 and 8, of the first and second sine wave envelope generators 1 and 2, are connected to rotary actuating means such as the spaced parallel drive shafts 24 and 25. The shaft 24, for the first sine wave generator 1, has a concentric friction drive cylinder 26 fixed thereon with its periphery in frictional contact with the ball 20, constituting means for rotating the rotor 7 and pointer 13 relative to the stator coils 5 and 4, as well as the drive for the 2nd generator 2. Rotative adjustment of the knob 23 at the front of the panel moves the shifter rod 22 axially to change the drive or contact position of the ball 20 relative to the center of the drive disc 19 and the point of contact with the driven cylinder 26. This adjustment simultaneously determines the rate of rotation of both of the rotors 7 and 8 from zero rotation, with the ball at the center of the disc, to the maximum rate of rotation when the ball is adjusted to a position near the periphery of the disc 19, which rate should be about seven rotations per second, causing the sine wave generators 1 and 2 to each generate seven complete sine wave cycles per second. The parallel drive shafts 24 and 25 each have bevel gears 27 and 28 respectively fixed thereon, meshing with bevel gears 29 and 30, fixed on aligned input and output stub shafts of an adjustable differential drive gear means 31 interposed between the two generators. The differential drive means is adjustable by an adjusting knob 32 at the front of the panel, also shown in Figure 1.

The differential gear drive means 31 comprises an adjustable ring gear 33 carrying idler bevel pinions 34 journaled thereon meshing at opposite sides with bevel gears 35 and 36 fixed respectively on the drive shafts 37 and 38 on which are fixed the bevel gears 29 and 30. Suitable journal bearings are provided for supporting the differential gear unit. An adjustment shaft 39 carries a spur pinion 40 fixed thereon in meshing relation with the ring gear 33, the shaft 39 being drivably connected to the phase adjustment knob 31 by the shaft 40 and bevel gears 41. Rotative adjustment of the knob 32 rotates the shaft 40 to adjust the rotative position of the ring gear 33, adjusting the position of the axles of the idler gears 34 and correspondingly rotating the bevel gear 36 relative to the bevel gear 35, thereby adjusting the position of the rotor 8 and pointer 14 relative to the position of the rotor 7 and pointer 13 during the rotation thereof by the motor 15.

The exciting coils 9—10 and 11—12 of the sine wave generators 1 and 2 are energized by transformers 41 and 42 respectively, through circuit conductors 44—45 and 46—47 and potentiometer or adjustable resistances 50—51 are connected to the transformer output conductors. Connections between the end terminals of the exciting coils 9—10 and 11—12 and their circuit connectors 44, 45 and 46—47 being made through conventional slip rings, not shown. A suitable A. C. electrical source is connected to the input terminals of the transformers 41 and 42 respectively by the conductors 48 and 49 terminating at the posts 48a and 49a also shown in Figure 1. An A. C. source such as a 24 v., 400 A. C. source can be connected to these posts 48a and 49a, energizing the rotor coils 9—10 and 11—12 accordingly.

The free ends $S_1$ and $S_2$ of the stator coils 3—4 and 5—6 are connected respectively by conductors 52, 53 and 54, 55 to the input sides respectively of two transformers 56 and 57, potentiometers or adjustable resistance elements 58 and 59 being interposed between the transformers 56 and 57 and the conductors 52, 53 and 54, 55, the electrical output conductors 60 and 61 from the transformers 56 and 57 respectively being connected to terminal posts 60a and 61a, located on the front panel of the apparatus, as shown also in Figure 1.

Connected respectively in the circuits shown in Figure 2, which are connected to the stator coils 3—4 and 5—6 are rectifiers 62, 63 and filters 64, 65, and adjustable resistances 67 and 68, the conductors 69 and 70 connect the posts 69a and 70a (also shown in Figure 1) to the conductors 52 and 55, intermediate the resistance elements 67 and 68 respectively and the rectifiers 62 and 63.

Conductors 71 and 72 are connected at one end to the posts 71a and 72a shown in front of the panel, the opposite ends of the conductors being connected between the $S_2$ terminals of the stator coils 4 and 6, and the rectifiers 62 and 63. The posts or terminals 73a and 74a are connected by conductors 73 and 74 to the filter elements 64 and 65, while the posts 75a and 76a are connected to the conductors 52 and 54 respectively by the conductors 75 and 76. The adjustment knobs or dials 67a, 50a, 58a and 68a, 51a and 59a on the panel as shown in Figure 1 are suitably connected to the various potentiometers or resistance elements, by adjustment means or shafts for the respective resistance elements 67, 50, 58 for generator 1, and 68, 51 and 59 for the generator 2. An electrical null signal indicating instrument is indicated at 77 in Figures 1 and 2 having a pointer 78 and is connected to the electrical output of an electrical mixer 105, the input of which is adapted to be connected to the output of the electrical equipment 104 under test.

If desired, a suitable multiple switch element may be provided for selectively connecting the various circuits through a measuring instrument, such as a voltmeter 79, as shown in Figure 3, having cooperating circuit terminals 80 to 90 and 91 to 101, and switch blade contact elements 102 and 103 being connected to the measuring instrument 79. Terminals 80 and 91 are then respectively connected to conductors 44 and 45 by conductors 80a and 91a. Terminals 81 and 92 are connected to conductors 47 and 46 respectively by wires 81a and 92. Terminals 82 and 93 are connected to conductors 52 and 53 by wires 82a and 93a, while terminals 83 and 94 are connected to conductors 54 and 55 by wires 83a and 94a and terminals 84 and 95 are connected by wires 84a and 95a to the conductors 75 and 73. Contact terminals 85 and 96 are connected through wires 85a and 96a to conductors 76 and 74, while conductor 86a connects the contact 86 to conductor 75 through a bridge conductor 82x also connected between conductors 82a, 84a, 86a, and conductor 88 from terminal 88. The contact 87 is connected by wire 87a, to wire 85a, through a connecting wire 85x, to conductor 76, the wire 85x being also connected to conductor 89a from contact terminal 89, the conductor 97a connecting wire 71 to contact terminal 97. The cooperating switch contact terminal 98, opposite contact 87, is connected through wire 98a to conductor 72. As before pointed out terminal 88 is connected through wires 88a, 82x, and 82a to conductor 52, the opposite terminal 99 being connected to conductor 69 by wire 99a. The switch contact terminal 89 is connected through wires 85x and 85a to conductor 76 while the cooperating opposite switch terminal 100 is connected to conductor 70 by the wire 100a. The contact terminals 90 and 101 are "open" so that when the switch is moved onto these contact terminals the voltmeter or electrical measuring instrument 79 is disconnected from all circuits, these latter terminals (90 and 101) having leads 90a and 101a connected thereto which may be connected to any of the other terminals such as 48a or 60a, or 49a or 61a to measure electrical input to transformers 41 or 42 or the electrical output from the transformer 56 or 57.

At the left hand portion of Figure 3 are legends indicating the various positions of the switch element, while at the right are indicated the various electrical potentials from the different parts of the apparatus being measured when the switch is moved to the positions indicated, to bridge the indicated terminals' contact to the left of the indicated legends. For instance, with the switch elements 102, 103 in the position shown in Figure 3 the voltmeter will measure the second transformer or "autosyn" excitation circuit (current input to rotor coils 11—12 as shown in Figures 2 and 4).

In the operation of my improved multiple low frequency oscillator and phase shifter apparatus a piece of electrical apparatus to be checked, such as an auto pilot, indicated diagrammatically at 104 in Figure 2, is placed with its electrical input terminals connected to the terminals 60a from the first sine wave generator 1, assuming of course that all circuit outputs have been checked by the meter 79 through switch device 102, 103, the electrical output circuit from the equipment 104 being connected to a simple electrical mixer device indicated diagrammatically at 105. The electrical mixer device 105 has its other input terminals connected to the output terminals 61a of the second sine wave generator 2. The output terminals of the mixer device 105 are connected to the electrical null signal indicator 77 and for any particular test frequency selected at control 23 the phase and amplitude controls 32 and 59a are adjusted to bring the null signal indicating pointer 78 to zero, indicating a null signal or zero electrical output from the mixer 105, the output of the equipment 104 being tested balancing the electrical output from the second or comparative generator 2.

Adjustment of the knob 32, of course, adjusting the ring or pinion carrier gear 33, shown in Figure 4, to change the relative position of the rotor 8 of the second sine wave generator 2 to that of the rotor 7 of the first generator 1. This adjusts the relative position of the pointer 14 to that of the pointer 13 and the angular difference in phase between the sine waves generated is indicated at any point in the rotation of the generator by noting the dial indicia surrounding the ends of the pointers and the relations of the pointers thereo. The ratio of the outputs of the two generators represents the gain or loss factor of the equipment under test at the frequency that the test is made. This is indicated by comparison of the dial indicia surrounding the knobs 67a, 50a, 58a and 68a, 51a, 59a. The phase angle difference introduced by the equipment 104 being tested may be read directly in degrees of lead or lag from the relative angular relation of the pointer indicators 13 and 14 on the panel since they are directly connected to the generator rotors 7 and 8 of generators 1 and 2 and thus their relative positions and angular relations can be observed. The amplitude of each generator can be easily measured by reducing the frequency of the sine wave generator outputs, by manipulating the knob 23 to draw the ball member 20 toward the center of the driving disc 19 (Fig. 4) until a conventional vacuum tube voltmeter at 79 (Fig. 2), connected between terminals 82, 93 (for generator 1) or between terminals 83, 94 (for generator 2), can follow the rise and fall of the wave, and then reading the amplitude when the sine wave peaks are reached.

Any variations in the input and output signals during changes in phase will also be noted during the operation at different adjusted frequencies as indicated by the variations in the position of the null signal pointer 78 with respect to the zero position shown in Figure 1.

The invention is described in connection with one exemplification for explanatory purposes, it being obvious that various changes and modifications of a minor nature may be made without departing from the spirit of the invention as defined in the following claims.

I claim:

1. Test apparatus comprising first and second test signal generators, each of said generators having an input circuit, an output circuit and a rotatable shaft and operating upon application of an alternating voltage of constant amplitude and frequency to said input circuit and a constant speed of rotation to said shaft to generate in said output circuit an alternating test voltage of the same frequency as said input voltage and the amplitude of which cyclically varies at a period equal to the period of shaft rotation and long relative to the period of said alternating voltage, means for energizing the input circuits of said generators with a common alternating voltage, means for rotating the shaft of the first generator at a constant relatively low speed, a one to one coupling between the shaft of said first generator and the shaft of said second generator, said coupling containing means for adjusting the relative angular positions of the two shafts, means for applying the output of said first generator to the input of an electrical network to be tested, means for adjusting the amplitude of the output of the second generator, and means for indicating the difference between the output of network and said adjusted output.

2. Apparatus as claimed in claim 1 in which means are provided for rotating the shaft of the first generator at a constant, variable, relatively low speed.

3. In a multiple low frequency sine wave signal generator and phase shifter device for obtaining frequency response data on servo systems such as auto pilots for aircraft and low frequency filter networks used in aircraft recording systems; a first sine wave generator having an electrical input, and an electrical output adapted to be connected to the input of a piece of electrical equipment to be tested having an electrical output energized by the electrical input; an electrical mixer device having an electrical input adapted to be connected to the output of the equipment being tested and having an electrical output; a second sine wave generator having an electrical input, and an electrical output connected to the input of the mixer device; a null signal indicator having an electrical input connected to the output of the mixer device; power means connected to the first sine wave generator for actuating the same to produce a continuous sine wave output; adjustable differential drive means between the power means and the second sine wave generator for simultaneously actuating the same to produce a second continuous sine wave, and adjusting means connected to the differential drive means for adjusting the same to vary phase of the sine wave output of the second generator relative to the phase of the sine wave output of the first generator.

4. Apparatus as claimed in claim 3 including adjusting means between the power means and both of the sine wave generators for simultaneously varying the frequency of the sine wave outputs of the generators.

5. Apparatus as claimed in claim 4 including means for independently varying the amplitude of the sine wave outputs of each of the generators.

6. Apparatus as claimed in claim 5 including a pointer member connected to each of the sine wave generators to be driven thereby, and cooperating indicia therefor, for selectively indicating the phase angle of each generator and the relative angular phase relation between the sine wave outputs of the two generators.

7. Apparatus as claimed in claim 6 including electrical potential measuring means, and switch means therefor, for selectively connecting the measuring means to the electrical outputs of the sine wave generators for selectively measuring the amplitude of the electrical outputs of the sine wave generator.

8. Apparatus as claimed in claim 7 in which the switch means is shiftable to selectively connect the measuring means to the electrical inputs for the sine wave generators to selectively measure the input potentials to the sine wave generators.

9. In a multiple low frequency sine wave generator and phase shifter apparatus, a first sine wave generator; a second sine wave generator; power means operatively connected to the first sine wave generator for actuating the same at a predetermined uniform rate to produce a continuous sine wave having a predetermined uniform frequency; differential drive means connected between the first sine wave generator and the second sine wave generator for actuating the second sine wave generator to simultaneously produce a continuous similar frequency sine wave; means for selectively adjusting the differential drive means between the sine wave generators for varying the phase of the sine wave from the second generator relative to the phase of the sine wave from the first generator.

10. Apparatus as claimed in claim 9 including continuously-variable speed drive means connected intermediate the power means and the sine wave generators for simultaneously varying the speed of the sine wave generators to simultaneously vary the sine wave frequencies thereof.

11. In a multiple low frequency sine wave signal generator and phase shifter testing apparatus; a constant speed motor having a power output shaft; a first sine wave generator having a drive shaft and a sine wave output; continuously variable speed change means connected between the power output shaft and the first generator drive shaft; a second sine wave generator having a drive shaft and a sine wave output; differential drive means connected between the first generator drive shaft and the second generator drive shaft for driving the second sine wave generator drive shaft from the first sine wave generator drive shaft at identical rates, and means for adjusting the differential drive means for rotatably adjusting the second generator drive shaft relative to the first generator drive shaft to adjust the phase relation of the second generator sine wave output relative to the phase of the first generator sine wave output.

12. In a multiple low frequency sine wave signal generator and phase shifter apparatus; a constant speed motor having a reduced speed power output shaft; a rotary friction drive disc driven thereby having a friction face, a first generator drive shaft disposed in spaced parallel relation to the friction face in a plane perpendicular to the friction face extending through the center of the face, a friction drive cylinder mounted concentrically on the first generator drive shaft, a friction drive ball member intermediate the cylinder and disc in frictional contact therewith, a ball shifter carrier member surrounding the ball member intermediate the cylinder and disc, means for shifting the carrier in parallel relation to the axis of the first generator drive shaft, a second sine wave generator drive shaft disposed in spaced parallel relation to the first sine wave generator drive shaft, differential drive gear means connected between the ends of the first and second sine wave generator drive shafts comprising a ring gear, idler bevel pinions journalled in the ring gear on axes perpendicular to the axis of the ring gear, independently rotatable bevel gears concentrically journalled at opposite sides of the ring gear in meshing relation with the idler bevel pinions at opposite edges thereof, a pair of axially aligned separate drive shafts, one fixed to each of the independently rotatable bevel gears, positive drive means between one of the axially aligned drive shafts and the first sine wave generator and positive drive means between the other of the axially aligned drive shafts and the second generator drive shaft and manually adjustable means for adjusting the ring gear to change the rotative angular position of the second generator drive shaft relative to the rotative angular position of the first generator drive shaft for varying the phase relation of the sine wave output of the second generator relative to the phase of the sine wave of the first generator during simultaneous actuation of the sine wave generators by the constant speed motor.

WALTER J. HIRTREITER.

No references cited.